Jan. 20, 1942.  H. T. KRAFT  2,270,657
HORIZONTAL BALANCE
Filed May 27, 1940
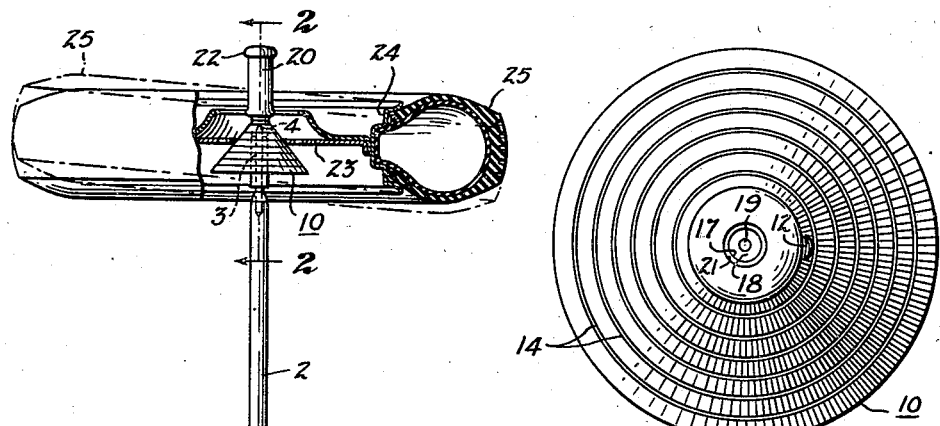
Fig.1
Fig.3
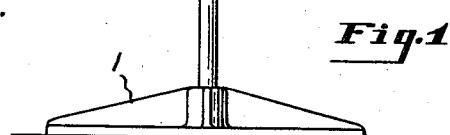
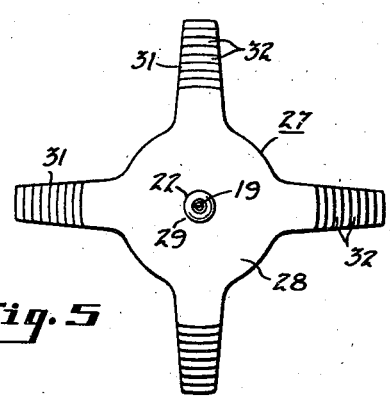
Fig.5
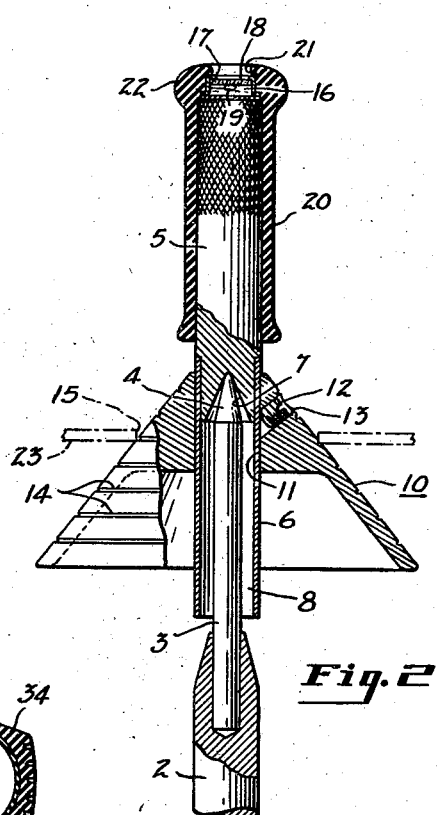
Fig.2
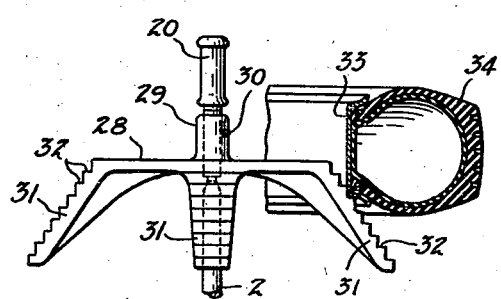
Fig.4
INVENTOR
Herman T. Kraft
BY Evans + McCoy
ATTORNEYS Patented Jan. 20, 1942

2,270,657

UNITED STATES PATENT OFFICE 2,270,657

HORIZONTAL BALANCE

Herman T. Kraft, Akron, Ohio, assignor to The General Tire & Rubber Company, Akron, Ohio, a corporation of Ohio Application May 27, 1940, Serial No. 337,332

3 Claims. (Cl. 73—53)

This invention relates to wheel and tire balances, and has particular reference to balances of this character for use in statically balancing automobile tires and wheels and the like in a horizontal plane so that they will operate at high speed without vibration or shimmy. It is an object of the invention to provide an improved balance by means of which tires and wheels of different size can be supported horizontally on a vertical spindle and the condition of the balance of the wheel determined by visual observation of the position of the wheel with respect to the horizontal.

Another object is to provide a wheel balance having means for carrying a wheel unit or tire on the upper end of a vertical spindle and in which the wheel carrier can be adjusted vertically with respect to the spindle end so as to raise and lower the center of gravity of the unit to be balanced with respect to the spindle end.

A more specific object of the invention is to provide a device for carrying a tire or wheel to be statically balanced, which can be quickly and easily lifted onto a vertical spindle and which is provided with means for indicating the position of the device with respect to the horizontal so that the condition of balance of a wheel carried thereby may be readily determined by visual observation.

Other objects and advantages of the device, including an improved handle for manipulating the wheel carrying unit and an improved wheel carrier having interfitting engagement with a wheel to be balanced, will become apparent from the following detailed description of different embodiments of the invention made in connection with the accompanying drawing, in which like parts throughout the several figures are indicated by the same numerals of reference.

Figure 1 is an elevational view showing the wheel balance with an automobile wheel mounted thereon and partly broken away and in section to show the manner in which the carrier of the wheel balance interfits with the wheel supported thereby;

Fig. 2 is an elevational detail view, partly in section and with parts broken away, taken substantially on the line 2—2 of Fig. 1 and enlarged with respect thereto;

Fig. 3 is a top or plan view of the parts of the wheel mounting unit shown in Fig. 2;

Fig. 4 is a fragmentary, elevational view showing a modification of the support unit and a fragment of a wheel in section mounted thereon; and Fig. 5 is a top or plan view of the wheel mounting unit shown in Fig. 4.

The wheel balance comprises a base or stand 1 having mounted thereon an upwardly extending, substantially vertical rod or post 2 surmounted by a spindle 3 (Fig. 2) of hardened metal, such as steel drill rod. The spindle 3 is formed at its upper end with a tapered pivot point 4, the stand and post being so proportioned that the pivot 4 is carried at about waist height, convenient for the operator. An elongated holder, comprising a body portion 5 preferably of steel, and a tubular portion 6 which may be of brass or steel and extends as a continuation of the body 5, is receivable over the spindle 3. The lower end of the body is formed with a surface hardened and tapered socket 7 which receives the point 4 of the spindle. The internal diameter of passage 8 in the tubular portion 6 of the holder is materially greater than the diameter of the spindle 3 so that the holder can be tiltably mounted on the point 4 of the spindle. However, the manner in which the spindle is telescopically received within the holder prevents the holder from becoming dislodged and also limits the degree of tilting permitted the holder. Preferably, the socket 7 is of substantially conical shape, as shown, and of a wider angle than the tapered end 4 of the spindle, so that the holder is relatively free for tilting movement on the spindle.

A carrier 10 of conical form is provided with an axially extending bore or passage 11 to slidingly receive the tubular portion 6 of the holder. The carrier is adjustable to different elevational positions on the holder in order to raise and lower the center of gravity of the unit relative to the pivot end 4 of the spindle. A threaded set screw 12, received in a threaded socket 13 formed in the carrier 10 and angularly disposed relative to the axis thereof, is arranged to bear against the tubular portion 6 of the holder to lock or retain the carrier in adjusted position relative to the holder.

If desired, the outer surface of the carrier 10 may be formed with a multiplicity of spaced, circumferentially extending annular grooves 14. These grooves are adapted for engagement with inner peripheral edge 15 of a wheel structure to be mounted on the balance. By the provision of a multiplicity of grooves 14, distributed over the conical or tapered surface of the carrier 10, wheels having central openings of various sizes may be tested for static balance by the device of the present invention. In the event that the central opening of a wheel does not precisely coincide with one of the grooves 14, the grooves enable the operator to accurately observe the relation between the wheel and the conical carrier and to thereby position the wheel on the carrier 10 with the rotational axis of the wheel in approximate alignment with the axis of the holder. The conical character or shape of the carrier effects a wedging of the same in the wheel opening and retains the wheel in proper position during the balancing thereof.

On the upper end of the body portion 5 of the holder is mounted a device for indicating the position of the wheel carrying unit relative to the horizontal and to the vertical axis of the spindle 3. This device comprises a spirit level which may be of the kind having a body of suitable liquid 16 enclosed within a shell or casing 17. A transparent member 18, such as glass or the like and having a spherical internal surface, closes the top of the chamber so that the position of a bubble 19 within the chamber may be observed.

A tubular handle 20 formed of rubber or similar resilient and deformable material is telescopically received on the body 5 of the holder and is secured in place by a suitable adhesion agent, such as rubber cement. The upper end of the handle 20 is formed with a central opening 21 to receive the spirit level and the handle may have an annular thickened shoulder 22 within which the spirit level is recessed or embedded for protection of the same against breakage by blows or in case the unit is dropped.

In utilizing the device the wheel carrying unit may be left on the spindle 3 and each wheel to be balanced may be manually placed over the body 5 of the holder so that the carrier 10 has interfitting engagement with the opening in the wheel to support the latter in horizontal position, as shown in Fig. 1. The conventional automobile wheel has a disc or similar portion 23 in which is formed the opening 15 which receives the conical carrier 10. A rim 24 is secured to the outer periphery of the disc portion 23 and receives pneumatic tire 25. A statically balanced wheel is supported by the device in substantially horizontal position, as indicated by the full lines in Fig. 1, while an unbalanced wheel will tilt on the spindle 3 to a position such as that shown by the broken lines in Fig. 1. The operator or attendant, to balance the wheel, fixes one or more weights, not shown, to the rim 24 of the wheel at or adjacent the high side of the latter so as to balance the pivotally supported unit and to cause the same to assume a substantially horizontal position on the pivot 4.

The sensitivity of the wheel balance may be regulated by the position of the center of gravity of the combined wheel carrier and the wheel with respect to the tip end of the pivot 4. In the balancing of wheels by the device of the present invention there is a pendulum action of the wheel with respect to the pivot 4 and it is necessary that the center of gravity of the combined wheel carrier and wheel be lower than the tip end of the pivot 4. The closer the center of gravity of the balanced assembly is to the pivot 4, the more sensitive the device is to a condition of unbalance in the wheel. By shifting the carrier 10 up or down on the tubular portion 6 of the holder, the center of gravity of the wheel with respect to the pivot end 4 of the spindle may be adjusted so as to provide the degree of sensitivity required. As previously mentioned, this adjustment may be effected by loosening the set screw 12, sliding the carrier 10 to the desired position on the tubular sleeve portion 6 of the holder, and then tightening the set screw.

The tilting of the wheel on the pivot because of a condition of unbalance causes a corresponding tilting of the wheel carrying unit, which results in movement of the bubble 19 to a lateral or off-center position with respect to the sight glass or member 18. The extreme sensitivity of this bubble enables the operator to detect even a slight condition of unbalance in a wheel and remedy the same by application of proper weights to the wheel rim, as is well known. The particular form of the weights and the manner of attaching them to the wheel rim are not elements of the present invention, although it is contemplated to employ metallic clips or to weld short pieces of metal rod or wire to the wheel rim.

In Figs. 4 and 5 is illustrated a modification of the invention in which the carrier 10, previously described, is replaced by a much larger, spider-like carrier 27, illustrated in reduced size. This carrier has a disc-like body portion 28 provided with a central hub 29 receivable in sliding relation on the tubular portion 6 of the holder and having a set screw 30, by means of which the spider-like holder can be retained in various positions of elevation on the holder.

The spider is formed with a plurality of legs or arms 31 which project downwardly and radially outwardly from spaced points around the body 28. The upward side of each of the arms 31 is formed with a series of ledges or steps 32. These ledges or steps of all of the arms are arcuately formed, as shown in Fig. 5, in concentric relation to the axis of the spider, so that the corresponding ledges of the several arms cooperatively receive and support a wheel rim 33 carrying a tire 34. By the use of the modified carrier shown in Figs. 4 and 5, assemblies of tires and demountable rims may be balanced in a manner similar to that previously described.

While the modification of the device illustrated in Figs. 4 and 5 is shown in use for balancing a tire and rim assembly, it may also be used to balance a tire alone. In such case one of the tire beads is placed against the ledges 32 of the holder and in concentric relation to the axis of the holder. The device may be thus used in connection with the retreading of tires so that the new tread rubber to be added may be properly distributed for improved balance in the rebuilt tire.

The present invention thus provides an improved wheel balance having facile means for adjusting the center of gravity of the wheel to be balanced with respect to the pivot point and being provided with a sensitive level indicator which enables the operator to readily determine by visual observation the condition of balance of the wheel when supported by the device. It is to be understood, of course, that the carrier 27 is interchangeable with the carrier 10 on the tubular portion 6 of the holder so that in supplying the devices to service stations and the like only a single holder is provided and either the carrier 10 or carrier 27 is attached thereto, depending upon the type of wheel or tire and rim assembly to be balanced.

The principles of the present invention may be utilized in various ways, numerous modifications and alterations being contemplated, substitution of parts and changes in construction being resorted to as desired, it being understood that the embodiments shown in the drawing and described above are given merely for purposes of explanation and illustration without intending to limit the scope of the claims to the specific details disclosed.

What I claim is:

1. In a wheel balancer having a vertical spindle, a tiltable wheel supporting unit comprising an elongated holder having a tubular portion at its lower end providing an axial socket to receive the spindle, a carrier embracing the holder and adapted to receive and support a wheel, said carrier being adjustable by vertical sliding movement on the holder for raising and lowering the center of gravity of the same and a wheel supported thereby relative to the spindle, and means for retaining the carrier in adjusted position on the holder.

2. In a wheel balancer having a vertical spindle, a tiltable wheel supporting unit comprising an elongated holder having a tubular portion at its lower end providing an axial socket to receive the spindle, a carrier embracing the holder and adapted to receive and support a wheel, a rubber handle on the holder and having a thickened end portion projecting beyond the upper end of the holder, a recess in said projecting handle portion, and a spirit level disposed in said recess and embraced by the rubber of the handle, said rubber end projecting upwardly beyond the level to guard the latter.

3. In a wheel balancer having a vertical spindle, a tiltable wheel supporting unit comprising an elongated holder having a tubular portion at its lower end providing an axial socket to receive the spindle, a carrier embracing the holder and adapted to receive and support a wheel, a rubber handle on the holder and having a thickened end portion projecting beyond the upper end of the holder, a spirit level disposed between said upper end of the holder and the handle end and held in place by the latter, and an opening in the handle end exposing the top of the level, the end portion of the handle projecting above the level constituting a guard for the level.

HERMAN T. KRAFT.